United States Patent

[11] 3,593,225

[72] Inventor Reed E. Fisher
Parsippany, N.J.

[21] Appl. No. 861,760
[22] Filed Sept. 29, 1969
[45] Patented July 13, 1971
[73] Assignee The United States of America as represented by the Secretary of the Army

[54] L-BAND SWITCHABLE NARROW BANDSTOP FILTER
3 Claims, 4 Drawing Figs.

[52] U.S. Cl. ........ 333/73 S, 333/84 M, 333/82 A
[51] Int. Cl. ........ H03h 13/00, H01p 7/02, H01p 3/08
[50] Field of Search ........ 333/73, 73 S, 82; 307/256, 259; 334/41

[56] References Cited
UNITED STATES PATENTS

| | | | |
|---|---|---|---|
| 2,967,930 | 1/1961 | Anderson | 333/73 X |
| 2,968,012 | 1/1961 | Alstadter | 333/73 (S) |
| 2,984,802 | 5/1961 | Dyer et al. | 333/73 (S) |
| 3,150,325 | 9/1964 | Blattner | 333/73 X |
| 3,414,833 | 12/1968 | Tolliver | 334/41 X |
| 3,428,918 | 2/1969 | Matthaei | 333/73 X |

*Primary Examiner*—Herman Karl Saalbach
*Assistant Examiner*—Wm. H. Punter
*Attorneys*—Alva H. Bandy, William G. Gapcynski, Lawrence A. Neureither, Leonard Flank, William P. Murphy and Robert C. Sims

ABSTRACT: An air stripline filter has one or more loosely coupled parallel resonators. Each resonator has a shunt PIN diode tapped thereto. When the diode is forward biased by a reversible bias circuit the narrowband rejection notch of the filter is moved forward in frequency.

Reed E. Fisher,
INVENTOR
BY William P. Murphy
Robert C. Sims

Reed E. Fisher,
INVENTOR

BY William P. Murphy
Robert C. Sims

L-BAND SWITCHABLE NARROW BANDSTOP FILTER

BACKGROUND OF THE INVENTION

This invention is related to the field of bandstop filters. More particularly to the field of L-band switchable narrow bandstop filters. In the past a scheme of switching through or around a fixed waveguide bandstop filter by means of two diode switches was used. However, such microwave circuitry was very complex and expensive. The present invention using an air stripline filter with a shunt PIN diode reduces the complexity and cost, while giving as good or better results.

SUMMARY OF THE INVENTION

A microwave switchable narrow bandstop filter is made out of an air stripline. A nonlinear conducting means such as a PIN diode is connected through a bias circuit to each of the loosely coupled parallel quarter wave stubs. The single section switchable bandstop filter consists of a primary strip transmission line to which is loosely coupled a parallel quarter wave stub resonator. A shunt PIN diode is tapped onto the stub at a predetermined point. When the diode is reverse biased by the bias circuit, a sharp rejection notch appears at a predetermined (by design) first frequency. Forward bias on the diode reduces the resonator's electrical length and shifts the notch to second higher frequency. Moving the diode tap point toward the resonator's open end, increases the frequency shift and reduces the amount of midband attenuation at the first frequency. By the use of the bias circuit the filter will produce a rejection frequency band notch at a desired frequency band, and this notch can be switched upward in frequency when not wanted; thereby, presenting a low or lower VSWR in the above-mentioned frequency band.

DESCRIPTION OF THE PREFERRED EMBODIMENT

Figure 1:
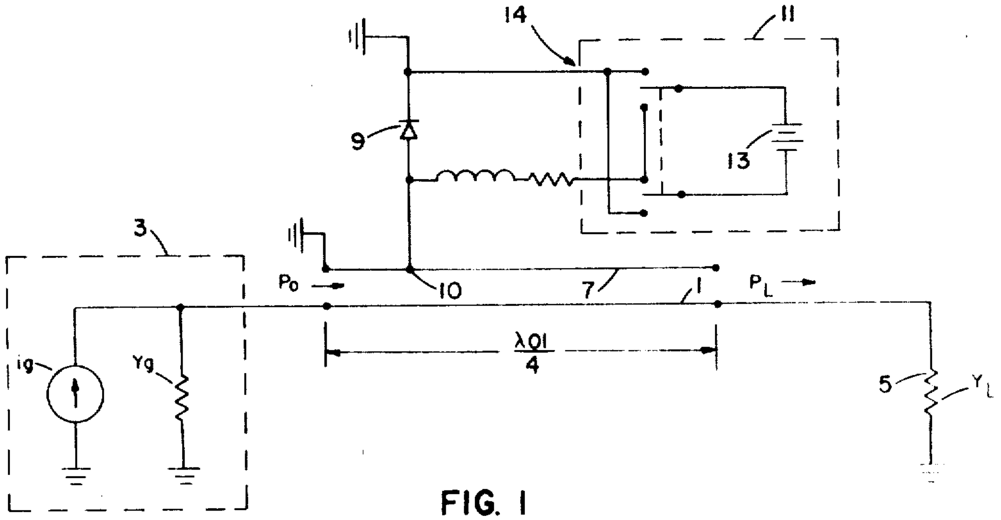
FIG. 1 is a schematic diagram illustrating a preferred form of the present invention.
Figure 2:
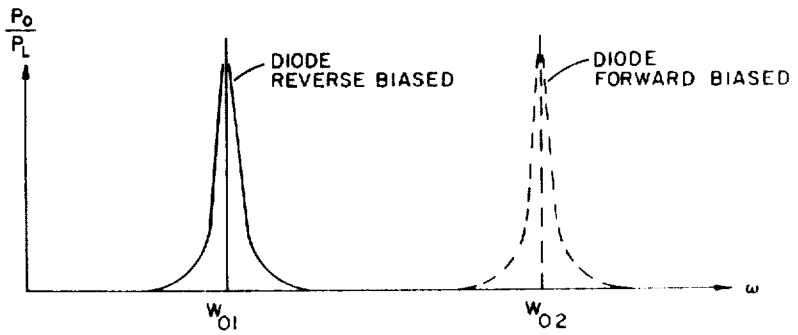
FIG. 2 is a graph of the bandstop filter characteristics with the power loss represented on the ordinate and frequency represented on the abscissa.

FIG. 1 shows a single section switchable bandstop filter. A primary air dielectric strip transmission line 1 is shown to be a quarter of the operating wavelength long; however, it could be of any larger length. A generator 3 having an internal admittance $Yg$ produces a current $i_g$ and a power output of $Po$. Generator 3 is connected to a load 5 by way of the strip transmission line 1 to deliver power $P_L$. The internal admittance $Yg$ of the generator is equal to the load admittance $Y_L$. A loosely coupled parallel quarter wavelength stub resonator 7 is provided to produce the band rejection of the filter. Resonator 7 is one-quarter of the wavelength of $W_{o1}$ shown in FIG. 2. One end of the resonator is shorted to ground while the other end is open. A shunt PIN diode 9 is tapped onto stub 7 at a desired point 10. A bias circuit 11 is connected to diode 9. Bias circuit 11 may consist of a DC power source 13 and a reversing switch 14 so that diode 9 may be selectively forward or reversed biased. When diode 9 is reverse biased by bias circuit 11 a sharp rejection notch appears at frequency $W_{o1}$ as is shown in FIG. 2. Forward diode bias reduces the electrical length of resonator 7 by providing a conductive path between point 10 and ground and, therefore, causes a frequency shift of the notch to $W_{o2}$. Moving the diode tap point 10 toward the open end of the resonator increases the frequency shift, but reduces the amount of midband attenuation (at $W_{o1}$). The length of resonator 7 is selected to be one-quarter of the wave length of $W_{o1}$. In the L-band a tap one-sixth of the length of stub 7 (or 0.389 inches) towards the shorted end causes a difference of about 150 MHz. between the frequencies of the two bands ($W_{o1}$ and $W_{o2}$).

Figure 3:
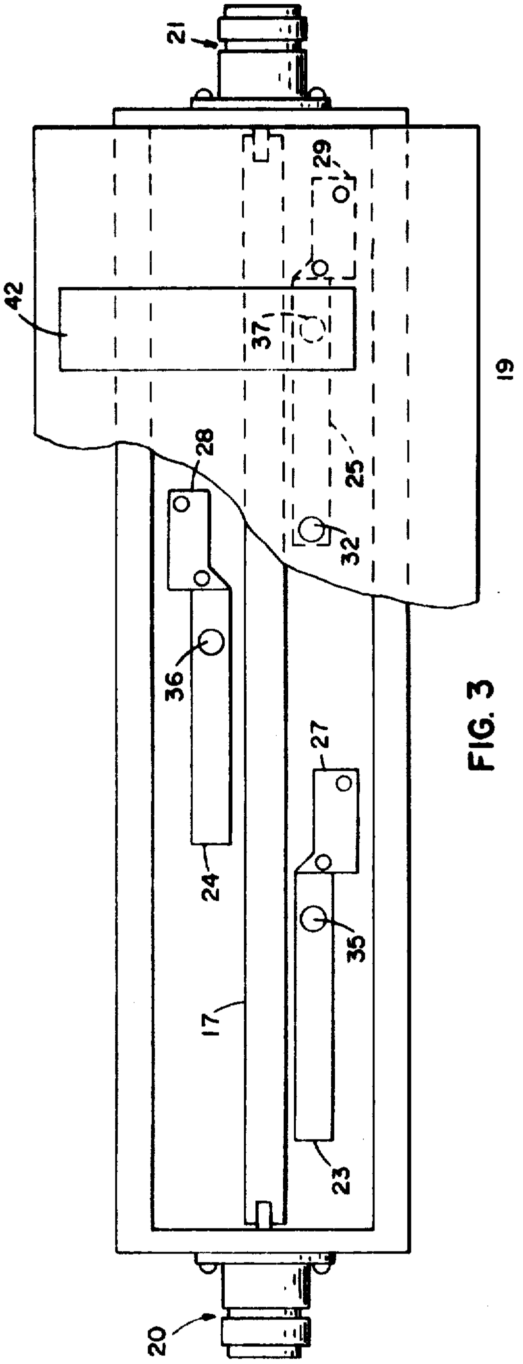
FIG. 3 is a top view, partially broken away, of a three stub L-band switchable narrow bandstop filter using the principles of the present invention.
Figure 4:
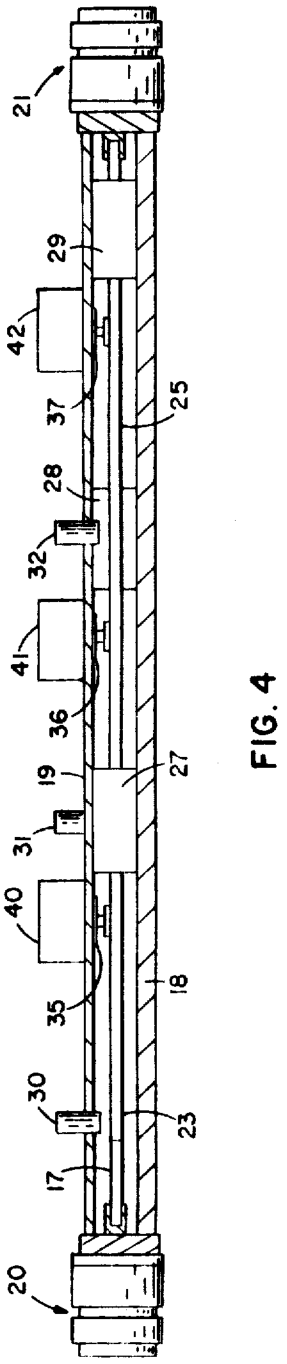
FIG. 4 is a side view, partially broken away, of the three stub filter.

FIGS. 3 and 4 show a three stub air stripline filter. The stripline center section 17 is positioned between ground planes 18 and 19. The ground planes are positioned 0.309 inches apart. Connectors 20 and 21 are provided for outside connections. Connectors 20 and 21 can be any of the known connectors such as stripline to coaxial connectors. Resonators 23—25 are located parallel to the centerline 17 so as to be loosely coupled to the centerline. The resonators are 2.11 inches long and their open ends are 2.27 inches apart in centerline measure. Resonators 23—25 and line 17 are each 0.286 inches in width and 0.064 inches in height. Resonators 23—25 are held in place and shorted at one end to both ground planes by shorting blocks 27—29. Appropriate fastening means, such as screws, connect the shorting blocks to ground planes 18 and 19. Tuning screws 30—32 may be provided so as to adjust the resonant frequency to the resonators. V-type PIN diodes 35—37 are positioned on the resonators 23—25 0.380 inches from the shorted end. Bias circuits 40—42 are positioned on ground plane 19 so as to supply the diodes 35—37. Although a two ground plane air dielectric stripline is shown, it is obvious that a nonair dielectric and/or a single ground plane stripline could be used.

When bandstop filter sections are cascaded as in the embodiment shown in FIGS. 3 and 4, the total loss becomes the sum of each section loss in db. plus an additional 6 db. for each quarter wavelength of transmission line separating the sections.

I claim:

1. A switchable, narrow bandstop, stripline filter having at least one resonator loosely coupled to said stripline, wherein said stripline has at least one ground plane; shorting connected between one end of the resonator and the ground plane; and a PIN diode connected between a predetermined point on the resonator and the ground plane; and a bias circuit connected to selectively forward or reverse bias said diode, wherein said filter highly attenuates only signals of a first arrow frequency band when the diode is reversed bias, and highly attenuates only a second narrow frequency band when said diode is forward biased.

2. A filter as set forth in claim 1, wherein said filter is an air dielectric stripline having two ground planes; said filter having more than one resonator; and a like number of diodes and shorting means.

3. A filter as set forth in claim 2 wherein each resonator has a length equal to one-fourth of the wavelength of the midfrequency of said first frequency band; and said predetermined point on each resonator is one sixth of the resonator's length towards the end of the resonator connected to the shorting means.